United States Patent [19]

Judd et al.

[11] 3,997,041
[45] Dec. 14, 1976

[54] ONE-WAY CLUTCH

[75] Inventors: Carl R. Judd; Howard D. Snyder, both of Ithaca, N.Y.

[73] Assignee: Borg-Warner Corporation, Chicago, Ill.

[22] Filed: Sept. 19, 1975

[21] Appl. No.: 615,000

[52] U.S. Cl. .................... 192/41 A; 192/45.1; 192/105 R
[51] Int. Cl.² ............... F16D 41/07; F16D 43/24
[58] Field of Search ............ 192/41 A, 45.1, 105 R

[56] References Cited

UNITED STATES PATENTS

| 2,010,885 | 8/1935 | Osterholm | 192/41 |
|---|---|---|---|
| 2,292,988 | 8/1942 | Bloomfield et al. | 192/45 |
| 2,737,275 | 3/1956 | Szady | 192/45.1 |
| 2,888,116 | 5/1959 | Troendly et al. | 192/45.1 |
| 3,165,183 | 1/1965 | Clements | 192/103 |
| 3,175,661 | 3/1965 | Maurer et al. | 192/45.1 |
| 3,545,581 | 12/1970 | Kent | 192/45.1 |
| 3,702,649 | 11/1972 | Giese et al. | 192/45.1 X |
| 3,844,391 | 10/1974 | Hallerberg | 192/45.1 X |

FOREIGN PATENTS OR APPLICATIONS

| 519,200 | 12/1955 | Canada | 192/45.1 |
|---|---|---|---|
| 911,853 | 11/1962 | United Kingdom | 192/45.1 |

*Primary Examiner*—Allan D. Herrmann
*Attorney, Agent, or Firm*—Aubrey L. Burgess

[57] ABSTRACT

A one way clutch in which the tiltable sprags rock away from contact with the outer race upon its overrunning of the inner race and to so remain until the inner race revolves in the same direction as the outer race whereupon centrifugal force acting on the sprags rotate them into full engagement with both races and couples the races together.

4 Claims, 4 Drawing Figures

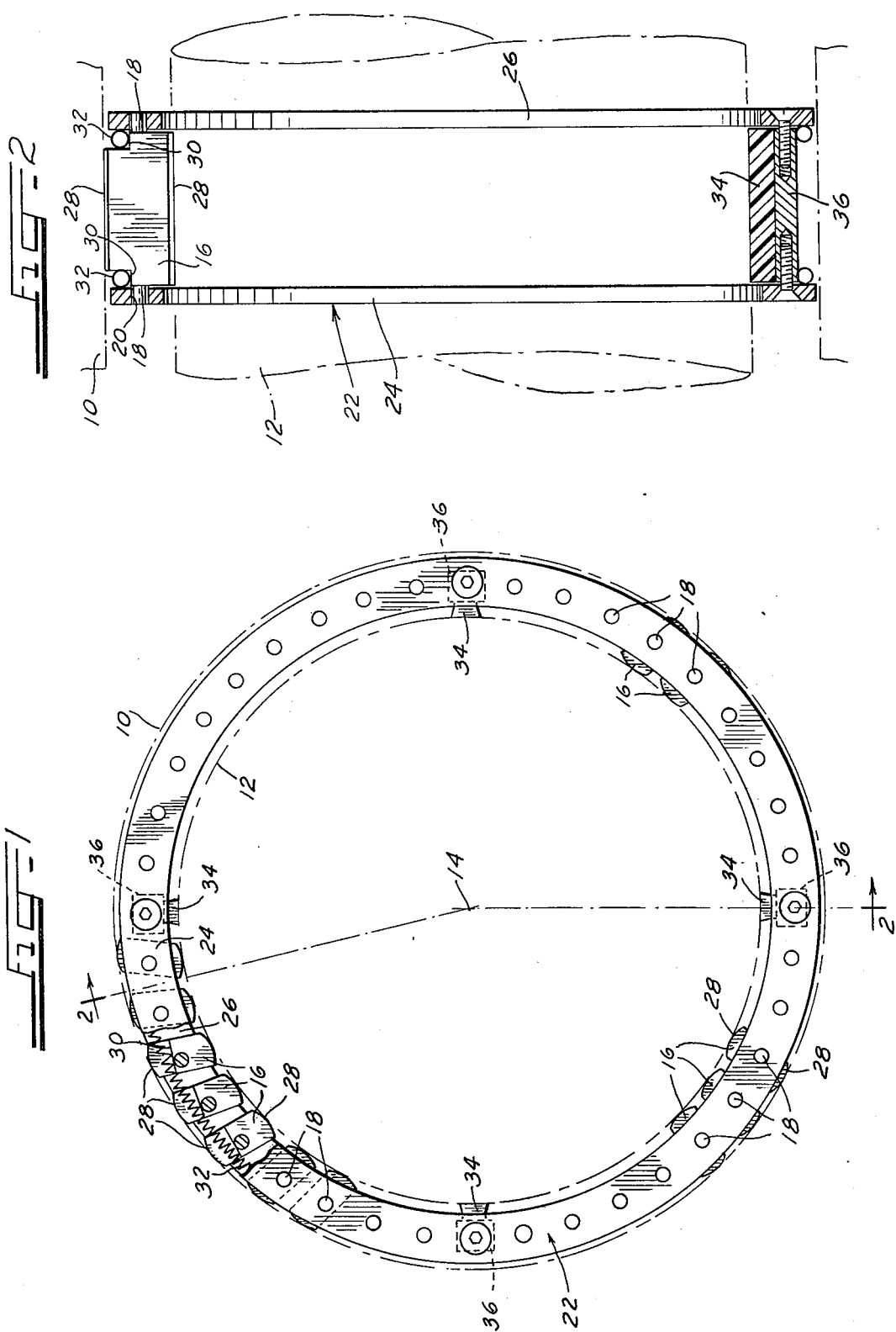

ONE-WAY CLUTCH

BACKGROUND OF THE INVENTION

The prior art is replete with various configurations of one-way clutch sprags and constructions of one-way clutches using the sprag configurations. Some of the sprags lift from the inner race upon its overrunning the outer race; some sprags lift from the outer race upon its overrunning the inner race; some sprags lift from both races upon one race overrunning the other.

THE INVENTION

According to this invention a one-way clutch is constructed such that when the outer race overruns the inner race, the cams or sprags disengage from the outer race rubbing surface by means of hydrodynamic viscous effects to minimize localized sprag and race wear. In this construction, the sprags will automatically reengage the outer race for driving when the races are brought to synchronous speeds.

The one-way clutch of the invention comprises sprags wherein the center of gravity is offset from their locating trunions, so that upon rotation of the sprags and cage, the sprags will be urged to rotate into an engaging position against both inner and outer races. The cage assembly incorporates resilient frictional members to retain the cage and sprags rotationally with the inner race. Contracting garter springs fitting sprag flats urge the sprags rotationally into engagement with the races.

Upon overrunning of the outer race, the sprags will be urged to rock away from the outer race by means of viscous shear of lubricant and will remain in this disengaged position until the inner race is revolved in the same direction as the outer race. As soon as the inner race is so revolved, centrifugal force acts on the sprags tending to cause sprag rotation and engagement with the races thus overcoming the tendency of the sprags to rock out of engagement with the races. Because of centrifugal force, the sprags will automatically be forced into engaging position with both races whenever the sprags are called upon to drive, i.e., by rotation of the inner race.

To obtain relative slippage between the outer race and the sprags, the cage and the sprags are restrained rotationally with the inner race; however a fixed relationship between the cage and sprags and the inner race is undesirable because some relative movement therebetween is required upon rotation of the sprags to their fully engaging positions. Thus only light frictional restraint is provided using resilient means connected to the cage and engaging the inner race. Not only is damage to the cage and sprags prevented, but each engagement will incrementally move the cage relative to the inner race, so that localized fatigue does not occur on the inner race contact surface.

The garter springs act in a rotational manner upon the sprags, so that engagement or contact of the sprags and inner race will occur at rest and at slow speeds — they apply a force radially inwardly on the sprags to maintain the inner race — sprag contact.

THE DRAWINGS

FIG. 1 is a side view with parts broken away illustrating a one-way clutch according to this invention;

FIG. 2 is a sectional view taken on line 2—2 of FIG. 1;

DETAILED DESCRIPTION

Figure 3:
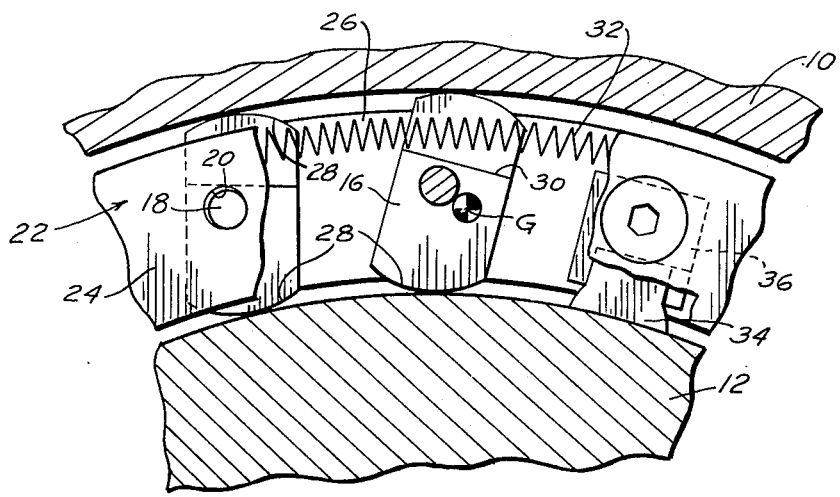
FIG. 3 is an enlarged partial and sectional view showing the sprags in race-engaging positions.
Figure 4:
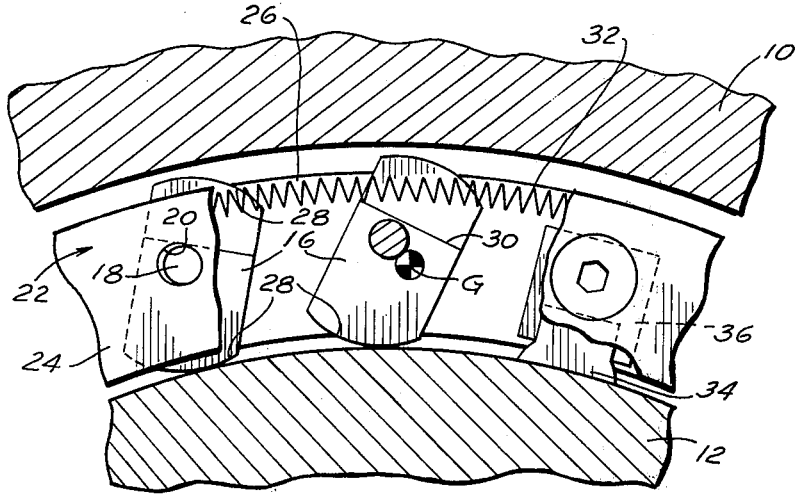
FIG. 4 is a view similar to FIG. 3 showing the sprags in outer race overrunning positions.

Looking now at the drawings, there is shown an outer race 10 and an inner race 12 both rotatable about an axis centrally thereof and identified by the reference character 14. In a specific usage the inner race will be mechanically coupled to a first shaft and the outer race will be mechanically coupled to a second shaft or other device. Between the two races, there are a plurality of cams or sprags 16, each pivotable on trunions 18 extending from the opposite ends thereof, which trunions are received in openings 20 in a cage assembly 22. The cage assembly generally comprises 2 annular rings 24, 26 spaced from each other by the sprags 16. Each sprag 16 has arcuate race engaging surface 28 generally composed of at least two radii and also has a center of gravity, designated by G offset from the axis of rotation, as defined within the trunions 18 by radially inwardly and circumferentially. Each sprag 16 also has notched portions 30 to receive an encompassing garter spring 32. A plurality of spaced resilient members 34 are connected to the cage assembly 22 such that the members 34 contact the outer race 10. These members 34 may be suitably held by a support 36 attached by machine screws to the cage members or rings 24, 26. They may be easily replaced as is necessary.

In operation when the races are both rotating, they are coupled by the sprags. When the inner race ceases rotation, the outer race overruns and the cams are urged to rotate in a clockwise direction, as viewed in the drawings, so that they "lift" off the outer race. The springs also assist in radially urging the sprags toward the inner race. The cage and the sprags will generally not have relative movement with respect to the inner race because of the restraining means. Upon rotation of the inner race, centrifugal force on the sprags will cause them to rotate counterclockwise and thus engage the outer race to couple the races together.

We claim:

1. A one-way clutch comprising:
    an outer race and an inner race;
    tiltable sprags between said races carried by a cage means, each sprag being tiltable about an axis offset from the center of gravity thereof and having radially inner and outer race engaging and clamping surfaces;
    garter spring means positioned radially outwardly of said axis and center of gravity tending to rotate or pivot said sprags into race engaging position; and
    wherein upon overrunning of the outer race said sprags rock away from contact with the outer race because of the viscous shear of lubricant to remain until the inner race rotates in the same direction as the outer race when centrifugal force acting on the sprags rotates them into engagement with both races.

2. A one-way clutch as recited in claim 1 wherein said garter spring tends to maintain said sprags in engagement with said inner race during overrunning of said outer race.

3. A one-way clutch as recited in claim 1 further comprising means associated with said cage means and said inner race to restrain relative rotation of said cage means and said inner race.

4. A one-way clutch as recited in claim 3 wherein said associated means are resilient.

* * * * *